Jan. 29, 1952 W. R. JACOBSON 2,583,778

REPRODUCING APPARATUS

Filed May 4, 1950 2 SHEETS—SHEET 1

Inventor:
Woodrow R. Jacobson,
by Paul A. Frank
His Attorney.

Jan. 29, 1952 W. R. JACOBSON 2,583,778

REPRODUCING APPARATUS

Filed May 4, 1950 2 SHEETS—SHEET 2

Inventor:
Woodrow R. Jacobson,
by Paul A. Frank
His Attorney.

Patented Jan. 29, 1952

2,583,778

UNITED STATES PATENT OFFICE 2,583,778

REPRODUCING APPARATUS

Woodrow R. Jacobson, Schenectady, N. Y., assignor to General Electric Company, a corporation of New York Application May 4, 1950, Serial No. 159,958

3 Claims. (Cl. 178—5.2)

My invention relates to picture reproducing apparatus and, more particularly, to apparatus for automatically producing color separation negatives, which are black and white negatives in which the black portion represents a particular shade of color in a picture being reproduced and the white portion represents all other colors.

In the field of printing and, more specifically, in the field of printing a design on wallpaper or perhaps a design on print cloth, it is customary to print the design on the paper or the cloth by passing the material to be printed over lithographic cylinders, each cylinder printing on the material one shade of color of the final picture. Because color separation negatives which are used in the photo-etching of lithographic cylinders are presently made entirely by hand artwork, the time, and, hence, the expense of making such negatives is extremely high.

At present, the artist making a color separation negative places a transparent sheet of material over an original artist's sketch and with brush and ink draws a pattern which is a copy of a particular color pattern. This process is repeated a number of times equal to the number of different colors in the sketch, and these reproductions are then used to make black and white photographic negatives.

It is, therefore, an object of my invention to provide new and improved apparatus which automatically produces color separation negatives of an original artist's sketch.

A major problem arising in automatic reproduction of color separation negatives is the inability of the apparatus to scan the sketch and to have the sensing element respond to only one preselected color. All other colors should cause no signal whatever in the detecting element since there must be no half-tones in a final color separation negative.

According to the illustrated embodiment of my invention, I provide an automatic color scanner which obviates the use of highly skilled personnel in the production of color separation negatives. In my apparatus, a beam of light is made to scan the picture to be reproduced and another beam of light is made to scan in corresponding manner a light sensitive photographic film. Due to an electronic circuit, the beam of light exciting the photographic film is only present when a predetermined color in the picture is being scanned. Consequently, the pattern which is recorded on the photographic film is an exact replica in black and white of a particular color pattern in the original picture or sketch being reproduced. The original sketch to be reproduced is scanned a number of times equivalent to the number of different colors in the sketch, and an equal number of negatives are produced. For each individual negative, an operator makes a few adjustments to the apparatus, such that the scanning unit responds to a predetermined color only, and without further attention during the actual scanning time the photographic film is automatically exposed.

Figures 1, 2:
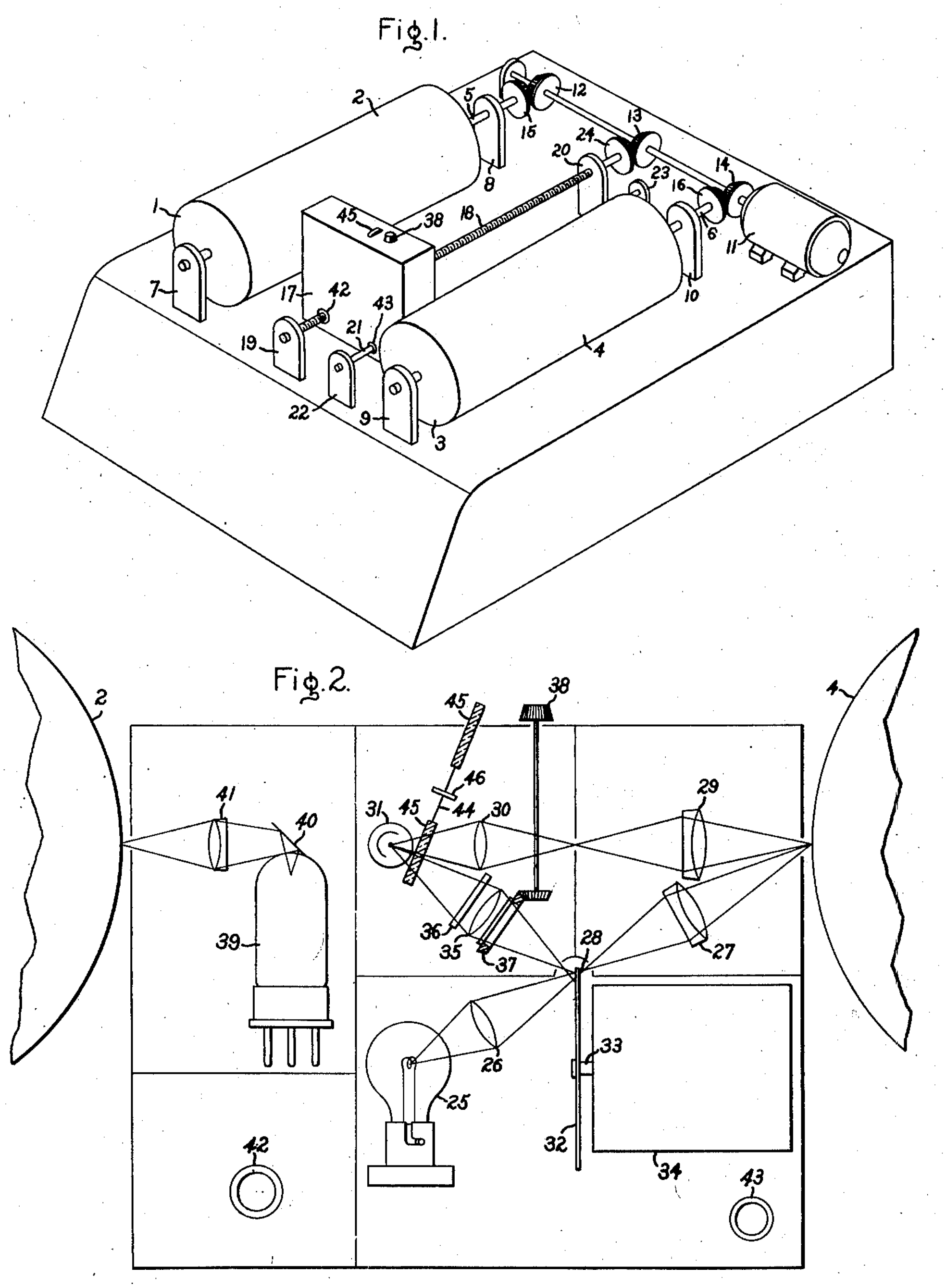
Figure 3:
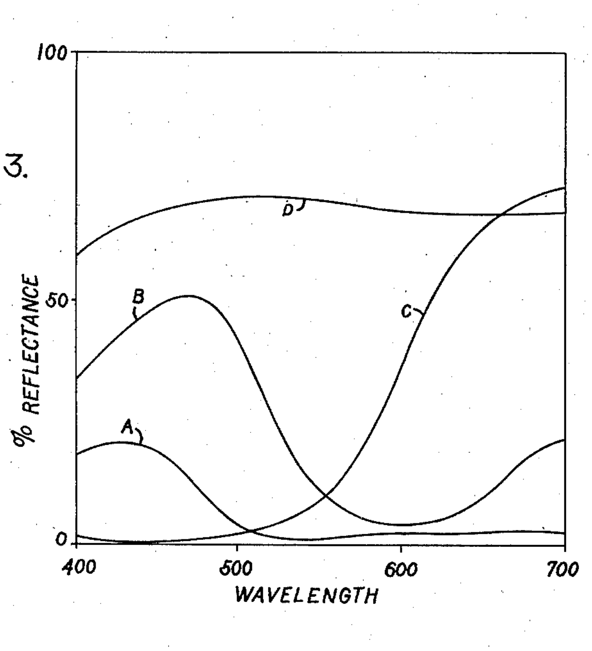
Figure 4:
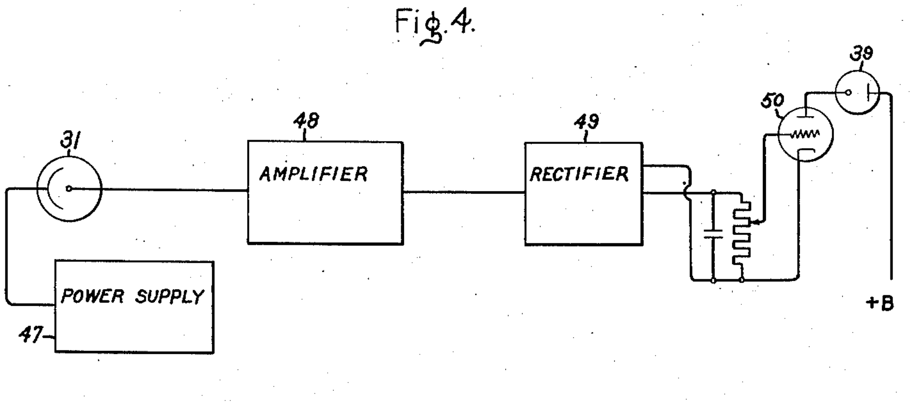

For additional objects and advantages, and for a better understanding of my invention, attention is now directed to the following description and accompanying drawing, and also the appended claims, in which the features of my invention believed to be novel are particularly pointed out, in which Fig. 1 is a pictorial view of apparatus built according to my invention; Fig. 2 is a schematic view of the scanning unit of the apparatus in Fig. 1; Fig. 3 is a graph of a number of spectrophotometric curves which may be applied to a picture being photographed by the apparatus of Fig. 1; and Fig. 4 is a schematic electric diagram of a light modulator circuit applicable to the apparatus of Fig. 1.

Referring to Fig. 1, a recording cylindrical drum 1 has mounted on its outer surface a photographic film 2, such that the light sensitive emulsion on the film is exposed, and a scanning cylindrical drum 3 has mounted on its outer surface a picture 4 which is to be reproduced. Drums 1 and 3 are mounted on shafts 5 and 6 respectively, and these shafts are supported in bearing supports 7, 8, 9 and 10, such that cylinders 1 and 3 are rotatable about shafts 5 and 6. An electric motor 11 has mounted on its shaft gears 12, 13 and 14. A gear 15, mounted on shaft 5, intermeshes with gear 12, and a gear 16, mounted on shaft 6, intermeshes with gear 14. A scanning unit 17 is mounted on a jackscrew 18 which is free to rotate in supports 19 and 20, and on a guide 21 which is supported by supports 22 and 23. A gear 24, which intermeshes with gear 13, is mounted on the extension of screw 18, and rotation of this gear results in the movement of unit 17 in a direction parallel to the longitudinal axes of cylinders 1 and 3. Rotation of the rotor of motor 11, therefore, results in the rotation of cylinder 1, cylinder 3, and the linear movement of scanning unit 17.

As is well-known in the art, rotation of the rotor of motor 11 will, with the proper selection of gear ratios and jackscrew pitch, result in the scanning of cylinders 1 and 3 by a point on each side of scanning unit 17 which is adjacent to cylinders 1 and 3 and at the height of their shafts. By making the gear ratio between gears 12 and 15 and between gears 14 and 16 equal, corresponding points on the opposite faces of unit 17 adjacent to cylinders 1 and 3 scans corresponding points on the cylinders and, hence, on the picture and film mounted on the cylinders.

As the scanning unit moves across the surfaces of the two drums, picture 4 is scanned by a pick-up section and, at the same time, a reproducing section emits a beam of light onto a corresponding point of the film 2. When a particular predetermined color on picture 4 is being scanned, a light is emitted from the reproducing section of unit 17 which intercepts film 2. When, however, the pick-up section of unit 17 scans a different color on picture 4, no light is focused from the reproducing section on film 2.

Referring to Fig. 2, in which the pick-up and reproducing sections are illustrated, a source of light 25 emits rays of light, some of which are focused by lenses 26 and 27 to a small spot on the surface of picture 4. A cross-over in the focused rays from lens 26 occurs at point 28. Those light rays emitted by source 25 and reflected from picture 4 are focused by means of lenses 29 and 30 to the light sensitive cathode of a phototube 31. A serrated disk 32, mounted on a shaft 33 such that it is free to rotate about its longitudinal axis, is positioned such that its serrated circumference intercepts those light rays focused by lens 26 at a point close to cross-over point 28, and shaft 33 is rotated by means of an electric motor 34. A lens 35 focuses light rays emitted by source 25 and reflected from disk 32 to the photosensitive cathode of phototube 31. Polaroid lenses 36 and 37, which lie in the path of this reflected light, have coinciding longitudinal axes and polaroid 37 is rotatable about this axis by means of knob 38. As well known in the art, polaroid lenses mounted in this manner may be used as a light attenuator. A modulator lamp 39 emits light rays which are reflected from mirror 40 and focused by lens 41 to a point on the light sensitive emulsion of photographic film 2, which corresponds to the point on picture 4 reflecting the beam of light from source 25. Cylindrical hole 42 is threaded such that it matches the thread of jackscrew 18 and cylindrical hole 43 surrounds guide 21 and guides the scanning unit along its lateral path.

In Fig. 3, curve A is the percent reflectance versus wave length of light striking a dark blue surface, curve B is a similar curve for light striking a light blue surface, curve C is a similar curve for light striking a red surface, and curve D is a similar curve for light striking a white surface. It can be seen from these curves that for light of any particular wave length the percent reflectance for the various colors differs and, therefore, the intensity of light reflected by these colors will differ.

Referring again to Fig. 2, disk 32 is rotated by motor 34 such that during one interval of time, light passes through the serrations of the disk toward lens 27, while during a following interval of time the light from source 25 is reflected from a tooth on disk 32 and focused by lens 35 on the cathode of tube 31. The serrations on disk 32 may be such that the intensity of the light passed by the disk is a sine$^2$ wave of intensity of light versus time in which the time of one cycle of the wave is the time required for successive serrations to pass any point along the path of the circumference of disk 32, and, conversely, the light reflected from the teeth on the disk is a cosine$^2$ wave having a wavelength equal to the wavelength of the passed wave. Because the sum of a sine$^2$ wave and a cosine$^2$ wave having the same frequency and the same amplitude is a constant, when the beam of light impinging on the cathode of tube 31 from picture 4 has the same intensity as the beam of light impinging on the cathode of tube 31 from disk 32, the current or voltage output of tube 31 has no alternating or ripple component.

A color wheel 44 has arranged about its perimeter a plurality of different narrow bandwidth color filters 45, any one of which by rotation of wheel 44 about pivot 46 can be made to intercept the reflected light from picture 4. It will be noted in the drawing that the color filters may intercept both that beam of light reflected from picture 4 and that beam reflected from serrated disk 32; however, this is unnecessary, and only that beam of light reflected from picture 4 need be filtered. This fact will be made evident hereinafter. Color filters 45 are narrow bandwidth filters or monochromatizing filters in which only an extremely narrow band of wavelengths is passed such that the beam of light striking tube 31 from picture 4 is essentially of only one color.

If it is desired to produce a black and white negative indicative of the dark blue color in picture 4, a filter passing a narrow band of wavelengths in the vicinity of 475 Angstroms may be used to intercept the reflected beam. From Fig. 3 it can be seen that such a filter will then pass a narrow band of wavelengths of light which has an intensity of approximately 20% reflectance when a dark blue color is scanned. With this filter, a light blue color will reflect light which has a reflectance of approximately 50% while a red color will reflect light having a reflectance of about 2%. By the proper adjustment of the angular position of polaroid lens 37, the light beam reflected from serrated disk 32 to phototube 31 may be attenuated such that it has an amplitude equal to a beam of light reflected from a surface having a 20% reflectance. Consequently, any light from a dark blue surface will be exactly compensated for by the light reflected from serrated disk 32 and no ripple voltage will appear in the output of phototube 31. If, however, during the scanning process the light striking picture 4 falls on another color, such, for example, as light blue, the amplitude of the light wave arriving at tube 31 from picture 4 will be much greater than the amplitude of the light wave reflected from disk 32 and a large ripple voltage will appear in the output of tube 31. Similarly, if a red color is scanned, the amplitude of the light wave reflected from the red color to tube 31 will be much less than the amplitude of the light wave reflected from disk 32 and, once more, a large ripple voltage will appear in the output of tube 31. It should, therefore, be noted that only the amplitude or intensity of the light reflected from disk 32 is used as the reference and it is immaterial whether filter 45 is used as an attenuator to partly adjust this intensity.

Referring to Fig. 4, a power supply 47 supplies anode voltage to phototube 31, the output of which is amplified by a conventional amplifier 48 and supplied to a conventional rectifier 49. Thus, if any alternating voltage appears in the output of tube 31, it is amplified by amplifier 48 and rectified by rectifier 49. The direct voltage output of rectifier 49 is, therefore, directly related to the alternating component of the output current of tube 31 and this output direct voltage of rectifier 49 is applied as a bias between the control electrode and the cathode of a conventional amplifying tube 50 in the plate circuit of which is a modulator lamp 39. By the proper selection of tube 50 and the operating points, a very small direct voltage output from rectifier 49 may be used to cut off tube 50 and, hence, cut off the light from modulator lamp 39. Modulator lamp 39, therefore, emits light rays when no alternating signal is applied to rectifier 49, but emits no light when a small alternating voltage is applied to rectifier 49. Light rays are, therefore, emitted from lamp 39 when a dark blue color is scanned, but, when any other color is scanned, no light rays whatsoever are emitted. Consequently, a black and white negative having no half tones is produced when photographic film 2 is developed, and the black portion represents the dark blue colors in the original sketch while the white portion represents all other colors. For a black and white color separation negative representing a light blue color, a monochromatizing filter passing a narrow band width in the vicinity of 510 Angstroms may be similarly employed and for a negative representing the red colors, a filter passing a narrow band width in the vicinity of 600 Angstroms may be employed. When the apparatus is adjusted for a different color, the filter corresponding to the new color desired is moved into the path of the light reflected from the picture, and knob 38 is adjusted such that the light reflected from disk 32 is attenuated to a value where it substantially equals the intensity of light reflected from the desired color.

This apparatus for producing color separation negatives has the advantage over presently used methods in that it is automatic, it produces pictures at a relatively rapid rate, the negative is an accurate reproduction of the original, and one operator may operate a number of machines at one time. A light-tight cover may, of course, be provided with this apparatus such that the picture may be scanned in a lighted room, although in this case the unexposed photographic film might still have to be mounted on the reproducing cylinder in darkness.

While my invention has been described by reference to particular embodiments thereof, it will be understood that this is by way of illustration of the principles involved and that those skilled in the art may make many modifications in the arrangement and mode of operation. Therefore, I contemplate by the appended claims to cover any such modifications as fall within the true spirit and scope of my invention.

What I claim as new and desire to secure by Letters Patent of the United States is:

1. In combination, a cylindrical scanning drum, a cylindrical recording drum, said drums having equal diameters and parallel longitudinal axes, a jackscrew driven scanning unit being located between said drums and having a lateral movement parallel to the longitudinal axes of said drums, an electric motor for rotating said jackscrew and said drums, said drums being rotated at equal velocities, said scanning unit comprising a source of light rays, means for focusing some of said rays into a narrow beam which is incident to said scanning drum, an electron discharge device being provided with an anode and a light sensitive cathode, the output voltage of said device being dependent upon the intensity of light striking said cathode, means for focusing rays of said beam reflected from said scanning drum on said cathode, a color wheel being rotatable about its longitudinal axis and having a multiplicity of different narrow bandwidth color filters mounted about its periphery, said wheel being located such that one of said filters intercepts the beam of light reflected from said recording drum, a rotatable circular disk having a serrated circumference and being located such that the serrations on said circumference intercept the beam of light from said source, said serrations being shaped such that the amplitude of light transmitted through said disk is a sine$^2$ wave, means for focusing light rays from said source reflected from said serrations on said cathode, a variable light attenuator located between said serrations and said cathode, a second source of light rays, means for focusing said rays into a narrow beam which is incident to said recording drum, and electronic means for controlling the intensity of light rays from said second source according to variations in the voltage output from said discharge device.

2. Optical apparatus comprising a first source of light rays, an interrupter disk located in the path of said rays, means for focusing to a point light rays passed by said interrupter disk, an electron discharge device provided with an anode and a light sensitive cathode, the output voltage of said device being dependent upon the intensity of light impinging on said cathode, means for focusing light rays reflected from said point on said cathode, a narrow bandwidth light filter located between said point and said cathode, means for focusing light rays reflected from said interrupter on said cathode, adjustable light attenuating means located in the path of said interrupter reflected light, a second source of light rays, means for focusing to a second point light rays from said second source, and electronic means for controlling light rays emitted from said second source by the variations in the voltage output of said discharge device.

3. Optical apparatus comprising a first source of light rays, a serrated rotatable interrupter disk being located in the path of said rays, serrations on said disk being shaped such that the intensity of light passed by said serrations is a sine$^2$ wave, means for focusing to a point light rays passed by said serrations, an electron discharge device provided with an anode and a light sensitive cathode, the output voltage of said device being dependent upon the intensity of light impinging on said cathode, means for focusing light rays reflected from said point on said cathode, a narrow bandwidth light filter located between said point and said cathode, means for focusing light rays reflected from said interrupter on said cathode, said interrupter reflected light having an intensity varying according to a cosine$^2$ wave, adjustable light attenuating means located in the path of said interrupter reflected light, a second source of light rays, means for focusing to a second point light rays from said second source, and electronic means responsive to the voltage output of said discharge device for energizing said second source only when the voltage output of said discharge device is a predetermined substantially constant value.

WOODROW R. JACOBSON.

REFERENCES CITED

The following references are of record in the file of this patent:

UNITED STATES PATENTS

| Number | Name | Date |
|---|---|---|
| 2,415,051 | Thompson | Jan. 28, 1947 |